(12) United States Patent
Meslioui

(10) Patent No.: US 11,698,032 B1
(45) Date of Patent: Jul. 11, 2023

(54) SYSTEMS AND METHODS FOR CONTROLLING NOISE IN AIRCRAFT POWERED BY HYBRID-ELECTRIC GAS TURBINE ENGINES

(71) Applicant: Pratt & Whitney Canada Corp., Longueuil (CA)

(72) Inventor: Sid-Ali Meslioui, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/738,404

(22) Filed: May 6, 2022

(51) Int. Cl.
*F02C 9/00* (2006.01)
*F02C 7/36* (2006.01)

(52) U.S. Cl.
CPC .......... *F02C 9/00* (2013.01); *F02C 7/36* (2013.01); *F05D 2220/323* (2013.01); *F05D 2260/4023* (2013.01); *F05D 2260/70* (2013.01); *F05D 2260/96* (2013.01); *F05D 2270/03* (2013.01); *F05D 2270/309* (2013.01)

(58) Field of Classification Search
CPC ........ F02C 9/00; F02C 7/36; F05D 2220/323; F05D 2260/4023; F05D 2260/70; F05D 2260/96; F05D 2270/03; F05D 2270/309
USPC .......................................................... 415/89
See application file for complete search history.

(56) References Cited

U.S. PATENT DOCUMENTS

| | | | |
|---|---|---|---|
| 6,712,314 B2 | 3/2004 | Stephan | |
| 8,291,716 B2 | 10/2012 | Foster | |
| 9,174,741 B2 | 11/2015 | Suntharalingam | |
| 9,493,249 B2 | 11/2016 | Shukla | |
| 10,843,807 B2 | 11/2020 | Bevirt | |
| 10,933,977 B2 | 3/2021 | Gartenberg | |
| 11,216,011 B2 | 1/2022 | De Lima | |
| 2010/0079342 A1 | 4/2010 | Smith | |
| 2017/0320584 A1* | 11/2017 | Menheere | B64D 27/24 |
| 2018/0327081 A1* | 11/2018 | Gartenberg | B64C 11/06 |
| 2021/0171212 A1 | 6/2021 | Keller | |

FOREIGN PATENT DOCUMENTS

| | | | |
|---|---|---|---|
| CN | 103759810 A | * | 4/2014 |
| CN | 103759810 A | | 4/2014 |

* cited by examiner

*Primary Examiner* — Yi-Kai Wang
(74) *Attorney, Agent, or Firm* — Getz Balich LLC

(57) ABSTRACT

A method for controlling noise emitted by a hybrid-electric gas turbine engine for an aircraft during a takeoff flight condition includes applying a first total rotational force to a shaft with a turbine and an electric motor. The first total rotational force includes a first electric rotational force applied by the electric motor and a first thermal rotational force applied by the turbine. The first total rotational force has a first rotational force ratio of the first electric rotational force to the first thermal rotational force. The method further includes controlling the noise emitted by the gas turbine engine by reducing the first rotational force ratio from an initial rotational force ratio of the rotational force ratio as an altitude of the aircraft increases and maintaining the first total rotational force substantially constant while reducing the rotational force ratio.

20 Claims, 4 Drawing Sheets

SYSTEMS AND METHODS FOR CONTROLLING NOISE IN AIRCRAFT POWERED BY HYBRID-ELECTRIC GAS TURBINE ENGINES

TECHNICAL FIELD

This disclosure relates generally to hybrid-electric gas turbine engines for aircraft and more particularly to systems and methods for controlling noise in aircraft powered by hybrid-electric gas turbine engines.

BACKGROUND OF THE ART

Noise generated by aircraft operations can have an undesirable impact on residents of communities in proximity to airports and urban centers. Gas turbine engines, in particular, may be a substantial source of aircraft noise, particularly during aircraft takeoff and landing operations. Aircraft noise regulations frequently require the strict procedural compliance during aircraft operations and may also require demonstration of compliance with applicable noise standards during aircraft certification processes. One option for reducing noise associated with gas turbine engines, is to reduce gas turbine engine power during certain flight conditions. However, sufficient propulsive capability must be maintained in order to satisfy aircraft performance and safety requirements. Accordingly, the capability of reducing aircraft noise in this manner may be limited. What is needed, therefore, are improved systems and methods for reducing aircraft noise without unduly restricting gas turbine engine propulsion.

SUMMARY

It should be understood that any or all of the features or embodiments described herein can be used or combined in any combination with each and every other feature or embodiment described herein unless expressly noted otherwise.

According to an aspect of the present disclosure, a method for controlling noise emitted by a hybrid-electric gas turbine engine for an aircraft during a takeoff flight condition includes applying a first total rotational force to a shaft with a turbine and an electric motor. The first total rotational force includes a first electric rotational force applied by the electric motor and a first thermal rotational force applied by the turbine. The first total rotational force has a first rotational force ratio of the first electric rotational force to the first thermal rotational force. The method further includes controlling the noise emitted by the gas turbine engine by reducing the first rotational force ratio from an initial rotational force ratio of the rotational force ratio as an altitude of the aircraft increases and maintaining the first total rotational force substantially constant while reducing the rotational force ratio.

In any of the aspects or embodiments described above and herein, the initial rotational force ratio may be at least 1:1.

In any of the aspects or embodiments described above and herein, the initial rotational force ratio may be between 1:1 and 2:1.

In any of the aspects or embodiments described above and herein, the initial rotational force ratio may be at least 2:1.

In any of the aspects or embodiments described above and herein, the step of controlling the noise emitted by the gas turbine engine may be performed during a first stage of the takeoff flight condition. The takeoff flight condition may include a second stage which is subsequent to the first stage. The method may further include applying a second total rotational force to the shaft with the turbine and the electric motor during the second stage. The second total rotational force may include a second electric rotational force applied by the electric motor and a second thermal rotational force applied by the turbine. The second total rotational force may have a second rotational force ratio of the second electric rotational force to the second thermal rotational force. The first total rotational force may be greater than the second total rotational force.

In any of the aspects or embodiments described above and herein, the first rotational force ratio may include a final rotational force ratio of the first stage and the final rotational force ratio may be different than the second rotational force ratio.

In any of the aspects or embodiments described above and herein, the method may further include driving a propeller with the shaft.

In any of the aspects or embodiments described above and herein, the step of controlling the noise emitted by the gas turbine engine may further include adjusting a pitch of a plurality of propeller blades of the propeller.

According to another aspect of the present disclosure, a hybrid-electric gas turbine engine for an aircraft includes a shaft, a turbine, an electric motor, and a controller. The shaft is rotatable about a rotational axis of the gas turbine engine. The turbine is configured to be driven by a flow of combustion gases through the gas turbine engine. The turbine is configured to apply a first thermal rotational force to the shaft. The electric motor is configured to apply a first electric rotational force to the shaft. The first thermal rotational force and the first electric rotational force define a first rotational force ratio of the first electric rotational force to the first thermal rotational force. The first thermal rotational force and the first electric rotational force further define a first total rotational force. The controller includes memory having instructions stored therein which, when executed by the controller, cause the controller to control the noise emitted by the gas turbine engine by: reducing the first rotational force ratio from an initial rotational force ratio as an altitude of the aircraft increases and maintaining the first total rotational force substantially constant while reducing the first rotational force ratio.

In any of the aspects or embodiments described above and herein, the initial rotational force ratio may be at least 1:1.

In any of the aspects or embodiments described above and herein, the initial rotational force ratio may be between 1:1 and 2:1.

In any of the aspects or embodiments described above and herein, the gas turbine engine may be a turboprop engine. The shaft may be configured to drive a propeller of the gas turbine engine.

In any of the aspects or embodiments described above and herein, the propeller may include a plurality of propeller blades. The propeller may further include an actuator system configured to adjust a pitch of the plurality of propeller blades.

In any of the aspects or embodiments described above and herein, the turbine may include a power shaft configured to be selectively coupled with the shaft to apply the first thermal rotational force to the shaft.

In any of the aspects or embodiments described above and herein, the electric motor may include a clutch configured to selectively couple the power shaft with the shaft.

In any of the aspects or embodiments described above and herein, the controller may be an electronic engine controller (EEC).

According to another aspect of the present disclosure, a method for controlling noise emitted by a hybrid-electric gas turbine engine for an aircraft during a takeoff flight condition includes applying a first total rotational force to a shaft with a turbine and an electric motor during a first stage of a takeoff flight condition. The first total rotational force includes a first electric rotational force applied by the electric motor and a first thermal rotational force applied by the turbine. The first total rotational force has a first rotational force ratio of the first electric rotational force to the first thermal rotational force. The method further includes applying a second total rotational force to the shaft with the turbine and the electric motor during a second stage of the takeoff flight condition, subsequent to the first stage. The second total rotational force includes a second electric rotational force applied by the electric motor and a second thermal rotational force applied by the turbine. The second total rotational force has a second rotational force ratio of the second electric rotational force to the second thermal rotational force. The method further includes controlling the noise emitted by the gas turbine engine by adjusting the first electric rotational force and the second electrical rotational force of the electric motor such that the first total rotational force is greater than the second total rotational force and the first rotational force ratio is different than the second rotational force ratio.

In any of the aspects or embodiments described above and herein, the aircraft may have a first average climb gradient the first stage and a second average climb gradient during the second stage, the first average climb gradient greater than the second average climb gradient.

In any of the aspects or embodiments described above and herein, the second rotational force ratio is greater than the first rotational force ratio.

In any of the aspects or embodiments described above and herein, the method may further include driving a propeller with the shaft. The step of controlling the noise emitted by the gas turbine engine may further include adjusting a pitch of a plurality of propeller blades of the propeller such that the plurality of propeller blades have a first pitch in the first stage and a second pitch in the second stage, and the first pitch is different than the second pitch.

According to another aspect of the present disclosure, a method for controlling noise emitted by a hybrid-electric gas turbine engine for an aircraft includes applying a thermal rotational force to a shaft with a turbine of the gas turbine engine operating at an operational power. The gas turbine engine has a predetermined minimum operational power level for a current flight condition of the aircraft. The method further includes applying an electric rotational force to the shaft with an electric motor and reducing noise emitted by the gas turbine engine by reducing the operational power of the turbine below the predetermined minimum operational power level for the current flight condition while the electric motor applies the electric rotational force to the shaft.

The present disclosure, and all its aspects, embodiments and advantages associated therewith will become more readily apparent in view of the detailed description provided below, including the accompanying drawings.

DETAILED DESCRIPTION

Figure 1:
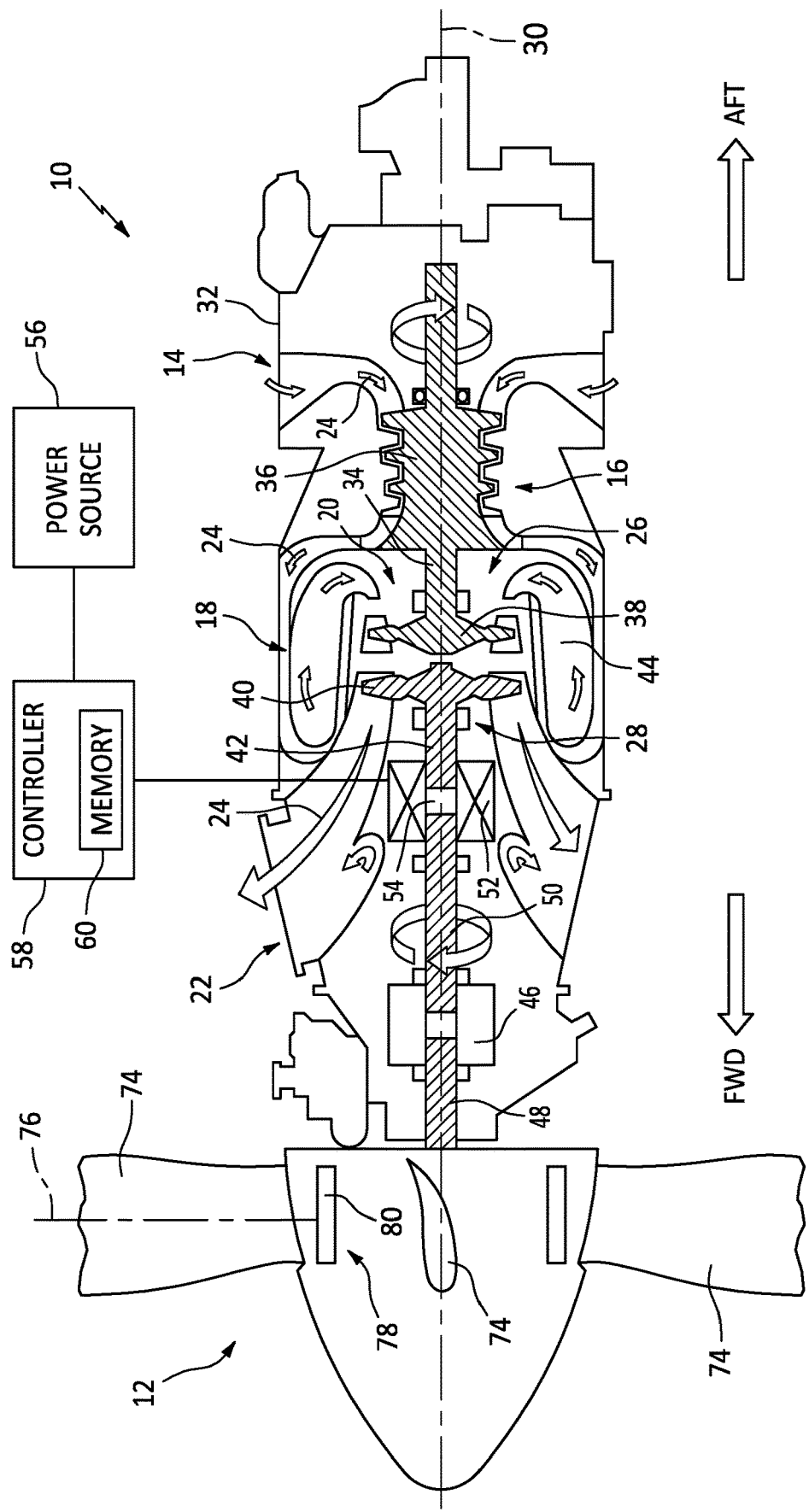
FIG. 1 illustrates a schematic view of a gas turbine engine, in accordance with one or more embodiments of the present disclosure.

Referring to FIGS. 1, an exemplary representation of a hybrid-electric gas turbine engine 10 is schematically illustrated. The gas turbine engine 10 of FIG. 1 is a multi-spool turboprop engine. However, while the following description and accompanying drawings refer to a turboprop engine as an example, it should be understood that aspects of the present disclosure may be equally applicable to other types of turbine engines including, but not limited to, turboshaft, turbofan, and turbojet gas turbine engines. The gas turbine engine 10 may be of a type preferably provided for use in subsonic flight to drive (e.g., apply a rotational force to) a propeller 12. The gas turbine engine 10 generally includes an air inlet 14, a compressor section 16, a combustor section 18, a turbine section 20, and an exhaust outlet 22. The compressor section 16 drives air from the air inlet 14 along a core flow path 24 for compression and communication into the combustor section 18 and then expansion through the turbine section 20.

The gas turbine engine 10 of FIG. 1 includes a high-pressure spool 26 and a low-pressure spool 28 mounted for rotation about a longitudinal centerline 30 (e.g., a rotational axis) of the gas turbine engine 10 relative to an engine static structure 32 (e.g., an engine case). The high-pressure spool 26 includes a high-pressure shaft 34 that interconnects a high-pressure compressor 36 and a high-pressure turbine 38. The low-pressure spool 28 includes a low-pressure power turbine 40 mounted to a power turbine shaft 42. It should be understood that "low pressure" and "high pressure" or variations thereof as used herein are relative terms indicating that the high pressure is greater than the low pressure. An annular combustor 44 is disposed between the high-pressure compressor 36 and the high-pressure turbine 38 along core flow path 24. In operation, airflow along the core flow path 24 is compressed by the high-pressure compressor 36, mixed and burned with fuel in the combustor 44, and then expanded through the high-pressure turbine 38 and the low-pressure power turbine 40. The low-pressure power turbine 40 and the high-pressure turbine 38 rotationally drive the low-pressure spool 28 and the high-pressure spool 26, respectively, in response to the expansion of the combustion gases. The combustion gases may then exit the gas turbine engine 10 via the exhaust outlet 22.

The high-pressure spool 26 and the low-pressure spool 28 of the gas turbine engine 10 of FIG. 1 are mechanically independent of one another so that they may rotate at different speeds and/or in opposite directions. The air flow through the gas turbine engine 10 along the core flow path 24 may be generally directed in an aft-to-forward direction, where the air inlet 14 may be disposed in a portion of the gas turbine engine 10 which is aft of the combustor 44 and the exhaust outlet 22 may be disposed in a portion of the gas turbine engine 10 which is forward of combustor 44. The exemplary configuration of gas turbine engine 10 of FIG. 1 may be referred to as a "reverse-flow free turbine engine."

In some embodiments, the gas turbine engine 10 may include a reduction gear box 46, an output shaft 48 coupled to the propeller 12, and an input shaft 50. The reduction gear box 46 may be configured to transfer rotational force from the input shaft 50 to the output shaft 48. The reduction gear box 46 may have a speed-reducing configuration so that the output shaft 48 may rotate at a lower speed than a rotational speed of the input shaft 50, thereby driving the propeller 12 with the output shaft 48 at a suitable rotational speed. The power turbine shaft 42 may be coupled to the input shaft 50 to as to apply a rotational force from the low-pressure power turbine 40 to the input shaft 50. As will be discussed in further detail, the power turbine shaft 42 may be selectively coupled to the input shaft 50. In some alternative embodiments, the power turbine shaft 42 may be directly coupled to the reduction gear box 46 or the propeller 12.

The propeller 12 of FIG. 1 includes a plurality of propeller blades 74 circumferentially spaced about the propeller 12 with respect to the longitudinal centerline 30. In some embodiments, one or more blades 74 of the plurality of propeller blades 74 may be configured to rotate to control a pitch of the respective propeller blades 74. For example, each propeller blade 74 may be configured to rotate about a respective blade axis 76. In some embodiments, the blade axis 76 may be substantially perpendicular to the longitudinal centerline 30, however, the propeller 12 is not limited to this particular configuration. The propeller 12 may include an actuation system 78 configured to effect rotation of the propeller blades 74 about their respective blade axes 76. As shown in FIG. 1, for example, the actuation system 78 may include a unison ring 80 disposed about the longitudinal centerline 30 and operably connected to the propeller blades 74. Rotation of the unison ring 80 about the longitudinal centerline 30 may thereby effect rotation of the propeller blades 74 about their respective blade axes 76. The actuation system 78 may include one or more actuators (e.g., hydraulic, pneumatic, electro-mechanical actuators) configured for effecting rotation of the unison ring 80 and/or the propeller blades 74, which are well known in the art. The actuation system 78 is exemplary and the present disclosure is not limited to any particular actuator configuration for actuation the propeller blades 74.

The gas turbine engine 10 of FIG. 1 includes an electric motor 52 configured to apply a rotational force to the propeller 12. The electric motor 52 may be coupled to one or both of the input shaft 50 and the power turbine shaft 42. The electric motor 52 may be configured to apply a rotational force to one or both of the input shaft 50 and the power turbine shaft 42. In some embodiments, the electric motor 52 may be configured to apply a rotational force to one or both of the input shaft 50 and the power turbine shaft 42 via a gearbox. The electric motor 52 may further include a clutch 54 configured to selectively couple the power turbine shaft 42 to the input shaft 50. Accordingly, the electric motor 52 may be configured to apply a rotational force to the input shaft 50 in combination with the power turbine shaft 42. Alternatively, the clutch 54 may be used to decouple the power turbine shaft 42 from the input shaft 50, thereby allowing the electric motor 52 to drive the input shaft 50 independent of the power turbine shaft 42. As noted above, in some embodiments, the power turbine shaft 42 may be directedly coupled to the reduction gear box 46 or the propeller 12. Accordingly, in some embodiments, the electric motor 52 may not include the clutch 54 and may, instead, be configured to apply a rotational force to only the power turbine shaft 42.

The electric motor 52 may be selected to be sufficiently powerful to drive the propeller 12 during all flight conditions independent of the power turbine shaft 42 and associated low-pressure power turbine 40. Electricity for operating the electric motor 52 may be supplied by an electric power source 56. Examples of the electric power source 56 include, but are not limited to one or more batteries, an auxiliary power unit (APU), and/or an electric generator of the gas turbine engine 10 and/or and electric generator associated with another gas turbine engine of the same aircraft onto which the gas turbine engine 10 is mounted (e.g., on a multi-engine aircraft).

The gas turbine engine 10 may further include a controller 58. The controller 58 may be in signal communication with the electric motor 52, the electric power source 56, and/or one or more other systems of the gas turbine engine 10. In some embodiments, for example, the controller 58 may be an electronic engine controller (EEC) for the gas turbine engine 10. The EEC may control operating parameters of the gas turbine engine 10 including, but not limited to, fuel flow, stator vane position, compressor air bleed valve position, etc. so as to control an engine power and/or thrust (e.g., an "operational power") of the gas turbine engine 10. As used herein, the term "operational power" refers to the power output the of thermal engine components of the gas turbine engine including, for example, the thermal rotational force applied to the propeller 12 from the low-pressure power turbine 40 via the power turbine shaft 42 and/or thrust provided from air and/or combustion gases flowing along the core flow path 24. In some embodiments, the EEC may be part of a full authority digital engine control (FADEC) system for the gas turbine engine 10. The controller 58 may include any type of computing device, computational circuit, or any type of process or processing circuit capable of executing a series of instructions that are stored in memory 60. The controller 58 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 60 may represent one or more algorithms for controlling the aspects of the gas turbine engine 10 operation, and the stored instructions are not limited to any particular form (e.g., program files, system data, buffers, drivers, utilities, system programs, etc.) provided they can be executed by the controller 58. The memory 60 may be a non-transitory computer readable storage medium configured to store instructions that when executed by one or more processors, cause the one or more processors to perform or cause the performance of certain functions. The memory 60 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 58 may be achieved via the use of hardware, software, firmware, or any combination thereof. The controller 58 may also include input and output devices (e.g., keyboards, buttons, switches, touch screens, video monitors, sensor readouts, data ports, etc.) that enable an operator to input instructions, receive data, etc.

The controller 58 may be configured to control the operation of electric motor 52 by providing suitable control signals to electric motor 52 and/or by providing suitable conditioning of the electric power supplied to electric motor 52 by electric power source 56. The controller 42 may control the amount of electric power supplied to the electrical motor 52 in response to control signals received by the controller 58, such as for example, commands sent via the input/output devices from a pilot of an aircraft to which the gas turbine engine 10 is mounted. The controller 58 and the electric power source 56 may be configured to supply sufficient electric power to the electrical motor 52 to produce some or all of the torque required to rotate the propeller 12 during some or all flight conditions of an aircraft to which the gas turbine engine 10 is mounted.

Referring to FIGS. 1-4, the noise generated during operation of gas turbine engines for aircraft, such as the gas turbine engine 10, can have an impact on residents of communities in proximity to airports and urban centers, particularly during the approach and departure of aircraft. Aircraft noise regulations frequently require the demonstration of compliance with applicable noise standards during aircraft certification processes.

Figure 2:
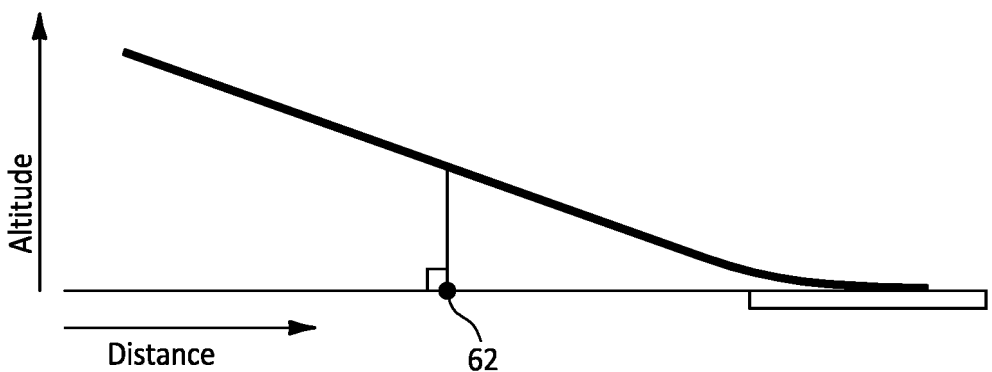
FIG. 2 illustrates an approach trajectory profile for an aircraft, in accordance with one or more embodiments of the present disclosure.
Figure 3:
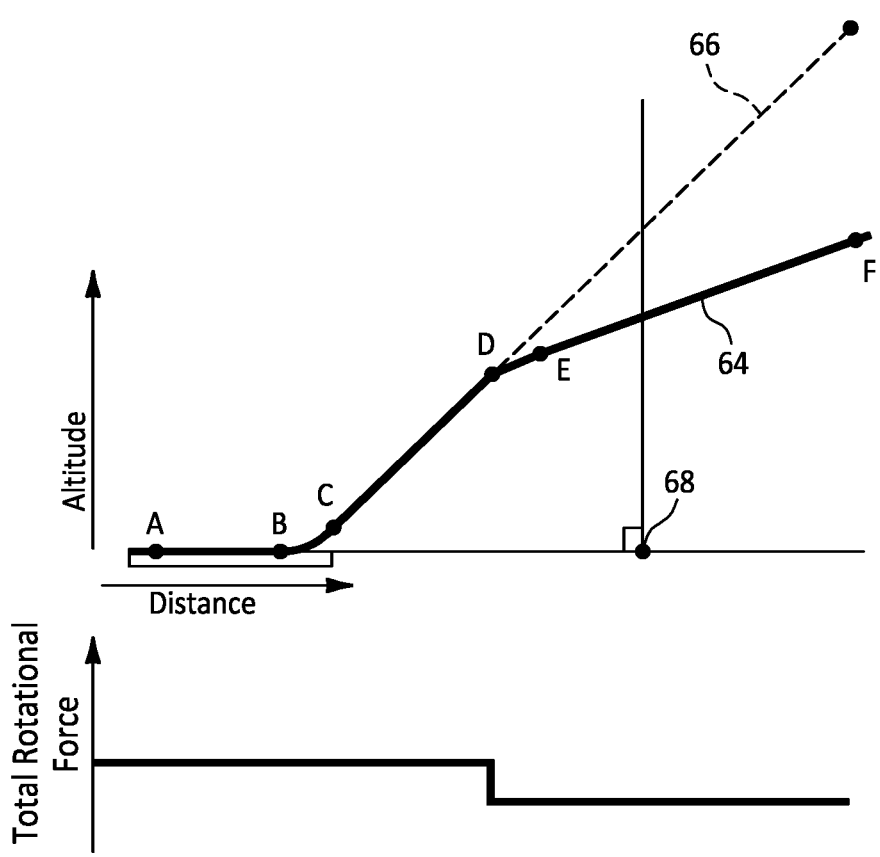
FIG. 3 illustrates an approach trajectory profile for an aircraft, in accordance with one or more embodiments of the present disclosure.
Figure 4:
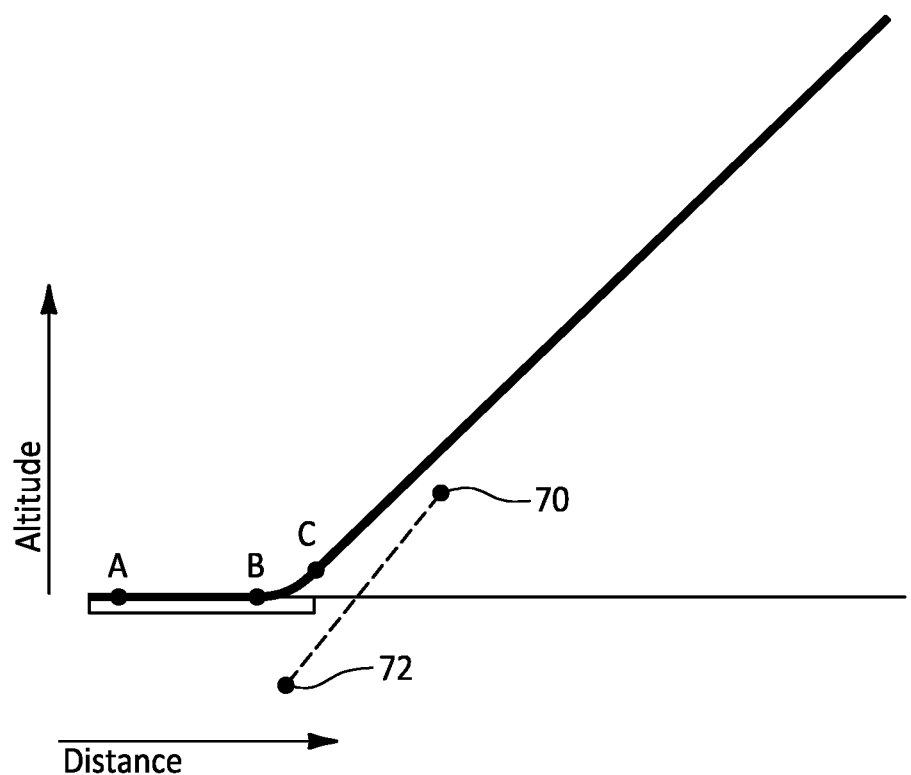
FIG. 4 illustrates an approach trajectory profile for an aircraft, in accordance with one or more embodiments of the present disclosure.

FIGS. 2-4 illustrate exemplary noise certification processes associated with approach and takeoff operations. The noise certification processes represent typical aircraft operations which are noise concerns for airports and adjacent communities. FIG. 2 illustrates an exemplary aircraft trajectory profile for a landing approach conditions. Gas turbine engine noise from an aircraft approach may become a concern at altitudes of approximately 5,000 feet or less, and more particularly, approximately 500 feet or less. An exemplary noise measurement position for an approach noise certification is represented in FIG. 2 as measurement position 62.

FIGS. 3 and 4 illustrate exemplary aircraft trajectory profiles for takeoff conditions. FIG. 3 illustrates a takeoff profile 64 with an operational power cutback flight condition and a takeoff profile 66 without an operational power cutback flight condition. In the takeoff profiles 64, 66 of FIG. 3, the aircraft begins the takeoff roll at point A, lifts off at point B, and initiates the first constant climb (e.g., a first stage of the takeoff flight condition) at point C. For the takeoff profile 64, a noise abatement operational power cutback may be initiated at point D and may be completed at point E where a second constant climb (e.g., a second stage of the takeoff flight condition) may be initiated. The second constant climb may have a climb gradient which is less than a climb gradient of the first constant climb. A "climb gradient" (or "angle of climb") may be understood as a ratio between distance travelled over the ground and altitude gained and is expressed as a percentage value. An operational power cutback takeoff profile 64 may be used to limit aircraft noise for takeoff, particularly where an airport has strict noise limitations due to surrounding communities or other noise concerns. Because the operational power of the one or more gas turbine engines for the aircraft is reduced, the potential climb gradient for the takeoff profile 64 is limited, for example, in comparison to the takeoff profile 66. Alternatively, the takeoff profile 66 does not include an operational power cutback and may continue the first constant climb up to a predetermined destination altitude. Gas turbine engine noise from an aircraft takeoff may become a concern at altitudes of approximately 10,000 feet or less, and more particularly, 2,000 feet or less. An exemplary noise measurement position for a takeoff noise certification is represented in FIG. 3 as measurement position 68. FIG. 4 illustrates exemplary lateral noise measurement positions 70, 72 for a takeoff noise certification. The lateral noise measurement positions 70, 72 are located on opposing lateral sides of a takeoff trajectory. Lateral noise measurement positions, such as the lateral noise measurement positions 70, 72, may also be used for noise certification of an aircraft approach condition such as the approach trajectory profile illustrated in FIG. 2.

Various features of a gas turbine engine, such as the gas turbine engine 10, can dominate the operational noise profile for the gas turbine engine, depending on the configuration and operational conditions of the gas turbine engine. For example, airframe noise, jet noise, propeller noise, and turbomachinery noise may all contribute to the operational noise profile for a gas turbine engine. Turbomachinery noise may include noise generated by engine rotating structures including, but not limited to, fans, compressors, turbines, as well as core gas flow and combustion from the combustor of the gas turbine engine. Turbomachinery noise from the gas turbine engine 10 may increase as the operational power of the gas turbine engine 10 increases. Noise from the electric motor 52 may additionally contribute to the operational noise profile for the gas turbine engine 10, however, the noise from the electric motor 52 can be expected to be significantly less than the turbomachinery noise from the gas turbine engine 10. Noise from the gas turbine engine can be reduced, therefore, by reducing the operational power of the gas turbine engine 10 and, for example, the rotational force applied by the low-pressure power turbine 40 to the propeller 12. However, the amount of acceptable operational power reduction for the gas turbine engine 10 may be limited by predetermined minimum operational power limits which may correspond to operational capabilities of the gas turbine engine 10 for an associated aircraft. The predetermined minimum operational power limits may be established for various flight conditions based on procedural and/or regulatory requirements for aircraft operation. For example, during an aircraft takeoff with a power cutback, the operational power for a gas turbine engine may generally be limited to at least an operational power which is sufficient to maintain (1) a climb gradient of at least four percent or (2) in the case of multi-engine aircraft, level flight with one engine inoperative (OEI), whichever predetermined minimum operational power level is greater. Application of the electric motor 52 to apply rotational force for gas turbine engine 10 propulsion, may allow procedural and/or regulatory requirements to be satisfied while also reducing the amount of noise generated by the gas turbine engine 10. In other words, operation of the electric motor 52 may limit gas turbine engine 10 noise without unacceptably impacting aircraft performance and/or safety.

Figure 5:
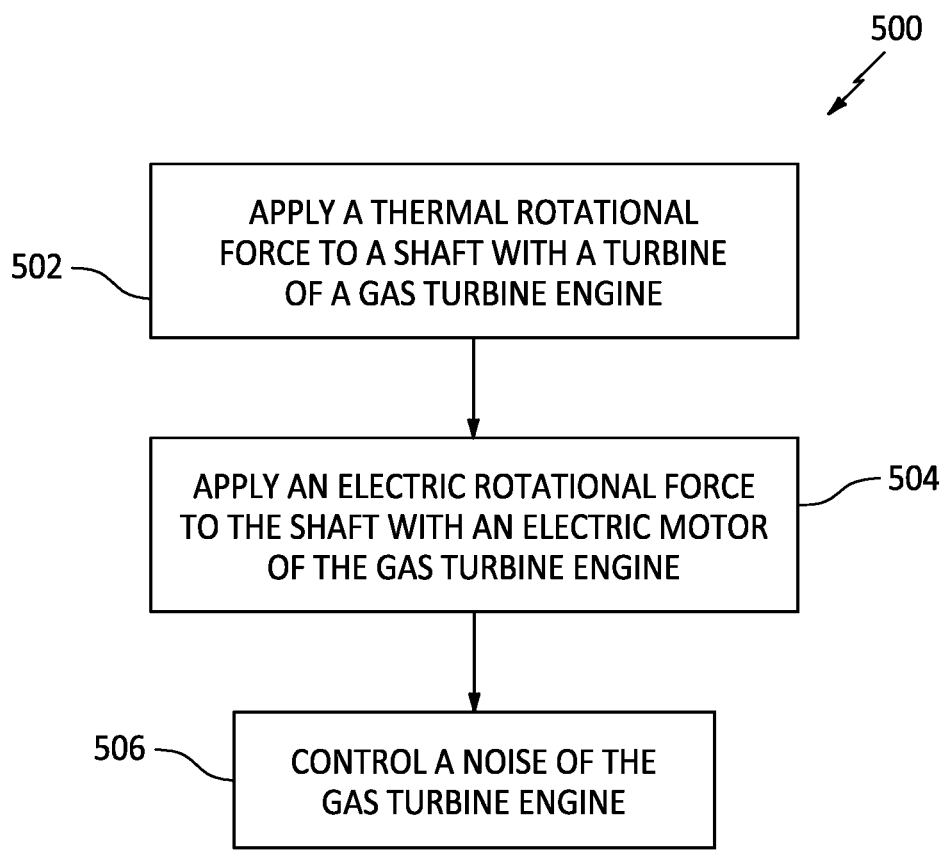
FIG. 5 illustrates a block diagram of a method for reducing noise emitted by a hybrid-electric gas turbine engine for an aircraft, in accordance with one or more embodiments of the present disclosure.

Referring to FIGS. 1 and 5, a method 500 reducing noise emitted by a hybrid-electric gas turbine engine for an aircraft is provided. FIG. 7 illustrates a flowchart of the method 500. For ease of description, the method 500 is described below with reference to the gas turbine engine 10. The method 500, however, may alternatively be performed with other gas turbine engines or aircraft propulsion systems. The controller 58 may execute instructions stored in memory 60, thereby causing the controller 58 to execute one or more steps of the method 500. Unless otherwise noted herein, it should be understood that the steps of method 500 are not required to be performed in the specific sequence in which they are discussed below and, in various embodiments, the steps of method 500 may be performed separately or simultaneously.

In Step 502, a thermal rotational force (e.g., a torque) is applied to the propeller 12 by the low-pressure power turbine 40. For example, the low-pressure power turbine 40 may drive the propeller 12 by applying the first rotational force via the power turbine shaft 42, the input shaft 50, and/or the output shaft 48, as discussed above. The term "thermal rotational force" is used herein to refer to the rotational force applied by the thermal engine components of the gas turbine engine 10, such as the low-pressure power turbine 40, to provide thrust for the aircraft.

In Step 504, an electric rotational force (e.g., a torque) is applied to the propeller 12 by the electric motor 52. For example, the electric motor 52 may drive the propeller 12 by applying the electric rotational force via the power turbine shaft 42, the input shaft 50, and/or the output shaft 48, as discussed above. The electric rotational force applied by the electric motor 52 may be in combination with the thermal rotational force applied by the low-pressure power turbine 40. The electric rotational force applied by the electric motor 52 may, at times, be the only rotational force applied to the propeller 12 via the power turbine shaft 42, the input shaft 50, and/or the output shaft 48. The term "electric rotational force" is used herein to refer to the rotational force applied by the electric motor 52 to provide thrust for the aircraft. The thermal rotational force and the electric rotational force may define a total rotational force which is applied directly or indirectly via the power turbine shaft 42, the input shaft 50, and/or the output shaft 48, as discussed above. The total rotational force may have a rotational force ratio which is a ratio of the electric rotational force to the thermal rotational force.

In Step 506, the noise emitted by the gas turbine engine 10 is controlled. Controlling the noise emitted by the gas turbine engine 10 may include controlling (e.g., regulating) the thermal rotational force applied by the low-pressure power turbine 40, the electric rotational force applied by the electric motor 52, and/or the pitch of the plurality of propeller blades 74. In particular, the operational power of the gas turbine engine 10 may be reduced by reducing thermal rotational force applied by the low-pressure power turbine 40 relative to the electric rotational force applied by the electric motor 52. The operational power of the gas turbine engine 10 may be reduced below the predetermined minimum operational power level for the current flight condition the gas turbine engine 10 and associated aircraft. In this case, the electric rotational force applied by the electric motor 52 may compensate for the reduction in the thermal rotational force applied by the low-pressure power turbine 40, thereby allowing the gas turbine engine 10 to maintain sufficient propulsive capability to support the current flight condition. In some embodiments, the thermal rotational force of the low-pressure power turbine 40 may be reduced while the electric rotational force applied by the electric motor 52 may be increased. For example, during a takeoff flight condition, a relatively high electric rotational force applied by the electric motor 52 may allow the gas turbine engine 10 to support an acceptable climb gradient while minimizing operational power, and thereby noise emitted from the gas turbine engine 10.

During a takeoff flight condition, the total rotational force may be maintained constant or substantially constant (i.e., maintained within a range of +/− five percent (5%) of the total rotational force) for all or a substantial portion of the takeoff flight condition. The total rotational force may have an initial rotational force ratio when the aircraft associated with the gas turbine engine 10 is on or proximate the ground. The initial rotational force ratio may be at least 1:1, electric rotational force to thermal rotational force. An initial rotational force ratio of at least 1:1 may correspond to a fifty percent (50%) reduction in a noise output of the gas turbine engine 10 relative to a conventional gas turbine engine (e.g., a gas turbine engine which does not use an electric motor to apply rotational force for propulsion). The initial rotational force ratio may be between 1:1 and 2:1, electric rotational force to thermal rotational force. The initial rotational force ratio may be at least 2:1, electric rotational force to thermal rotational force. An initial rotational force ratio of at least 2:1 may correspond to a seventy-five percent (75%) reduction in a noise output of the gas turbine engine 10 relative to a conventional gas turbine engine. As an altitude of the aircraft increases during a takeoff flight condition, the noise emitted by the gas turbine engine 10 may become less impactful at the ground (e.g., as measured by noise sensors on the ground). Step 506 may include reducing the rotational force ratio from the initial rotational force ratio as an altitude of the aircraft 1000 increases. Step 506 may further include maintaining the total rotational force substantially constant as the rotational force ratio is reduced from the initial force ratio. For example, the electric rotational force applied by the electric motor 52 may be reduced while the thermal rotational force applied by the low-pressure power turbine 40 is increased. The rotational force ratio may be reduced from the initial rotational force ratio to a final rotational force ratio for the takeoff flight condition or for a stage of the takeoff flight condition, where the final rotational force ratio is less than the initial rotational force ratio.

In the case of an operational power cutback flight condition for a takeoff, Step 506 may include applying a first total rotational force during a first stage of the takeoff flight condition and a second total rotational force during a second stage of the takeoff flight condition, where the first total rotational force is different than the second total rotational force. The first stage of the takeoff flight condition may have a first average climb gradient which is greater than a second average climb gradient of the second stage of the takeoff flight condition. For example, the first stage of the takeoff flight condition may include points B, C, and D of the takeoff profile 64 of FIG. 3 and the second stage of the takeoff flight condition may include points D, E, and F of the takeoff profile 64 of FIG. 3. The first total rotational force during the first stage may, therefore, be greater than the second total rotational force during the second stage. The first total rotational force and the second total rotational force may be maintained substantially constant during the respective first stage and second stage. In some embodiments, the first rotational force ratio may include a final rotational force ratio of the first stage, where the final rotational force ratio is different than the second rotational force ratio. For example, when initiating an operational power cutback (e.g., point D of the takeoff profile 64), the electric rotational force applied by the electric motor 52 may be reduced to establish the second total rotational force for the second stage of the takeoff flight condition. Alternatively, when initiating the operational power cutback, the thermal rotational force applied by the low-pressure power turbine 40 may be reduced to establish the second total rotational force for the second stage of the takeoff flight condition. Alternatively, when initiating the operational power cutback, the electric rotational force applied by the electric motor 52 and the thermal rotational force applied by the low-pressure power turbine 40 may be reduced to establish the second total rotational force for the second stage of the takeoff flight condition. In some embodiments, the thermal rotational force applied by the low-pressure power turbine 40 may be reduced in the second stage such that all or substantially all of the propulsive capability of the gas turbine engine 10 is provided by the electric motor 52.

In some other flight conditions, such as an approach condition, the power turbine shaft 42 may be decoupled from the input shaft 50 (e.g., using the clutch 54) such that the power turbine shaft 42 does not apply a rotational force to the input shaft 50. The low-pressure power turbine 40 may, therefore, be maintained in a "standby" condition in which the load on the low-pressure power turbine 40 is significantly reduced, but the low-pressure power turbine 40 continues to be driven by combustion gases along the core flow path 24. Accordingly, in the event that additional propulsive capability is required (e.g., fora turnaround procedure), the low-pressure power turbine 40 can be quickly re-coupled with the input shaft 50 to provide increased propulsive capability.

In some embodiments, Step 506 may additionally or alternatively include adjusting the pitch of each propeller blade 74 for the plurality of propeller blades 74 to reduce or further reduce the noise emitted by the gas turbine engine 10. By adjusting the propeller blade 74 pitch, the rotation speed of the propeller 12 may be decreased while the thrust provided by the propeller 12 may be maintained substantially constant (e.g., by increasing the propeller 12 torque).

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A method for controlling noise emitted by a hybrid-electric gas turbine engine for an aircraft during a takeoff flight condition, the method comprising:
applying a first total rotational force to a shaft with a turbine and an electric motor, the first total rotational force including a first electric rotational force applied by the electric motor and a first thermal rotational force applied by the turbine, the first total rotational force having a first rotational force ratio of the first electric rotational force to the first thermal rotational force; and
controlling the noise emitted by the gas turbine engine by:
reducing the first rotational force ratio from an initial rotational force ratio of the rotational force ratio as an altitude of the aircraft increases; and
maintaining the first total rotational force substantially constant while reducing the rotational force ratio.

2. The method of claim 1, wherein the initial rotational force ratio is at least 1:1.

3. The method of claim 2, wherein the initial rotational force ratio is between 1:1 and 2:1.

4. The method of claim 1, wherein the initial rotational force ratio is at least 2:1.

5. The method of claim 1, wherein the step of controlling the noise emitted by the gas turbine engine is performed during a first stage of the takeoff flight condition, the takeoff flight condition including a second stage, subsequent to the first stage, the method further comprising:
applying a second total rotational force to the shaft with the turbine and the electric motor during the second stage, the second total rotational force including a second electric rotational force applied by the electric motor and a second thermal rotational force applied by the turbine, the second total rotational force having a second rotational force ratio of the second electric rotational force to the second thermal rotational force, the first total rotational force greater than the second total rotational force.

6. The method of claim 5, wherein the first rotational force ratio includes a final rotational force ratio of the first stage and wherein the final rotational force ratio is different than the second rotational force ratio.

7. The method of claim 1, further comprising driving a propeller with the shaft.

8. The method of claim 7, wherein the step of controlling the noise emitted by the gas turbine engine further includes adjusting a pitch of a plurality of propeller blades of the propeller.

9. A hybrid-electric gas turbine engine for an aircraft, the gas turbine engine comprising:
- a shaft which is rotatable about a rotational axis of the gas turbine engine;
- a turbine configured to be driven by a flow of combustion gases through the gas turbine engine, the turbine configured to apply a first thermal rotational force to the shaft;
- an electric motor configured to apply a first electric rotational force to the shaft, the first thermal rotational force and the first electric rotational force defining a first rotational force ratio of the first electric rotational force to the first thermal rotational force, the first thermal rotational force and the first electric rotational force further defining a first total rotational force; and
- a controller including memory having instructions stored therein which, when executed by the controller, cause the controller to control the noise emitted by the gas turbine engine by:
  - reducing the first rotational force ratio from an initial rotational force ratio as an altitude of the aircraft increases; and
  - maintaining the first total rotational force substantially constant while reducing the first rotational force ratio.

10. The gas turbine engine of claim 9, wherein the initial rotational force ratio is at least 1:1.

11. The gas turbine engine of claim 10, wherein the initial rotational force ratio is between 1:1 and 2:1.

12. The gas turbine engine of claim 9, wherein the gas turbine engine is a turboprop engine, and wherein the shaft is configured to drive a propeller of the gas turbine engine.

13. The gas turbine engine of claim 12, wherein the propeller includes a plurality of propeller blades and wherein the propeller further includes an actuator system configured to adjust a pitch of the plurality of propeller blades.

14. The gas turbine engine of claim 9, wherein the turbine includes a power shaft configured to be selectively coupled with the shaft to apply the first thermal rotational force to the shaft.

15. The gas turbine engine of claim 14, wherein the electric motor includes a clutch configured to selectively couple the power shaft with the shaft.

16. The gas turbine engine of claim 9, wherein the controller is an electronic engine controller (EEC).

17. A method for controlling noise emitted by a hybrid-electric gas turbine engine for an aircraft during a takeoff flight condition, the method comprising:
- applying a first total rotational force to a shaft with a turbine and an electric motor during a first stage of a takeoff flight condition, the first total rotational force including a first electric rotational force applied by the electric motor and a first thermal rotational force applied by the turbine, the first total rotational force having a first rotational force ratio of the first electric rotational force to the first thermal rotational force;
- applying a second total rotational force to the shaft with the turbine and the electric motor during a second stage of the takeoff flight condition, subsequent to the first stage, the second total rotational force including a second electric rotational force applied by the electric motor and a second thermal rotational force applied by the turbine, the second total rotational force having a second rotational force ratio of the second electric rotational force to the second thermal rotational force; and
- controlling the noise emitted by the gas turbine engine by adjusting the first electric rotational force and the second electrical rotational force of the electric motor such that the first total rotational force is greater than the second total rotational force and the first rotational force ratio is different than the second rotational force ratio.

18. The method of claim 17, wherein the aircraft has a first average climb gradient the first stage and a second average climb gradient during the second stage, the first average climb gradient greater than the second average climb gradient.

19. The method of claim 17, wherein the second rotational force ratio is greater than the first rotational force ratio.

20. The method of claim 17, further comprising driving a propeller with the shaft, wherein the step of controlling the noise emitted by the gas turbine engine further includes adjusting a pitch of a plurality of propeller blades of the propeller such that the plurality of propeller blades have a first pitch in the first stage and a second pitch in the second stage, and the first pitch is different than the second pitch.

* * * * *